United States Patent
Morimura et al.

(10) Patent No.: US 9,902,381 B2
(45) Date of Patent: Feb. 27, 2018

(54) ABNORMALITY INFORMATION GENERATING APPARATUS AND VEHICLE CONTROL SYSTEM

(71) Applicant: Toyota Jidosha Kabushiki Kaisha, Toyota-shi, Aichi-ken (JP)

(72) Inventors: Junichi Morimura, Shizuoka-ken (JP); Fumichika Shimose, Toyota (JP)

(73) Assignee: Toyota Jidosha Kabushiki Kaisha

(*) Notice: Subject to any disclaimer, the term of this patent is extended or adjusted under 35 U.S.C. 154(b) by 27 days.

(21) Appl. No.: 15/064,910

(22) Filed: Mar. 9, 2016

(65) Prior Publication Data

US 2016/0272180 A1    Sep. 22, 2016

(30) Foreign Application Priority Data

Mar. 19, 2015 (JP) .................. 2015-056866

(51) Int. Cl.
    *B60T 8/92* (2006.01)
    *B60T 8/88* (2006.01)
(52) U.S. Cl.
    CPC .............. *B60T 8/885* (2013.01); *B60T 8/92* (2013.01); *B60T 2270/416* (2013.01)
(58) Field of Classification Search
    CPC ....... B60T 8/885; B60T 2270/416; B60T 8/92
    USPC .............. 701/69–71, 78–81, 93–95
    See application file for complete search history.

(56) References Cited

U.S. PATENT DOCUMENTS

| | | | |
|---|---|---|---|
| 6,526,367 B1 | 2/2003 | Yamamoto et al. | |
| 8,868,274 B2* | 10/2014 | Shiiba | B60L 11/14 180/65.1 |
| 2002/0091472 A1 | 7/2002 | Jager et al. | |
| 2009/0095576 A1* | 4/2009 | Miller | B60T 17/22 188/1.11 E |
| 2010/0004089 A1* | 1/2010 | Iwase | B60W 20/15 477/3 |

FOREIGN PATENT DOCUMENTS

| | | |
|---|---|---|
| EP | 2554446 A1 | 2/2013 |
| JP | H5-077709 A | 3/1993 |
| JP | H10332720 A | 12/1998 |
| JP | 2000-344091 A | 12/2000 |
| JP | 2007-076541 A | 3/2007 |
| JP | 4967140 B2 | 7/2012 |
| JP | 2014-034912 A | 2/2014 |
| JP | 2015-051691 A | 3/2015 |
| WO | 2011125412 A1 | 10/2011 |

* cited by examiner

Primary Examiner — Nga X Nguyen
(74) Attorney, Agent, or Firm — Dinsmore & Shohl LLP (57) ABSTRACT

An abnormality information generating apparatus is disclosed that generates information representing a rationality related to a plurality of vehicle wheel speed sensors that are installed at wheels of a vehicle, respectively. The abnormality information generating apparatus includes a processing device configured to generate the information when (1) a brake force is applied to the wheels, (2) a vehicle body speed based on an rpm of a rotation member is greater than a first threshold, the rotation member being common to drive wheels and being configured to transmit drive force to the drive wheels, and (3) only arbitrary one of the vehicle wheel speed sensors has a detected value smaller than a second threshold, the second threshold being smaller than the first threshold.

9 Claims, 8 Drawing Sheets

ABNORMALITY INFORMATION GENERATING APPARATUS AND VEHICLE CONTROL SYSTEM

CROSS REFERENCE TO RELATED APPLICATION

The present application claims priority to Japanese Patent Application No. 2015-056866, filed on Mar. 19, 2015, the entire contents of which are hereby incorporated by reference.

FIELD

The present disclosure is related to an abnormality information generating apparatus that generates information representing a rationality related to vehicle wheel speed sensors, and a vehicle control system that includes an abnormality information generating apparatus.

BACKGROUND

Japanese Laid-open Patent Publication No. 2014-034912 (referred to as "JP Publication 912", hereinafter) discloses a control apparatus for a vehicle that calculates a first vehicle speed based on vehicle wheel speeds, calculates a second vehicle speed based on a rotation speed of an output shaft of a transmission, determines a difference between the calculated first and second vehicle speeds, determines whether vehicle speed information is normal based on the value of the difference, and prevents an automatic stop of an engine when it is determined that the vehicle speed information is not normal.

The configuration disclosed in JP Publication 912 only determines whether the vehicle speed information is normal, but does not determine whether there are any abnormality in the vehicle wheel speed sensors.

Abnormality states of the vehicle wheel speed sensors include a rationality, in addition to a broken wire, a short circuit between a power supply and a ground, an abnormal output state (i.e., Out of Range), etc. The rationality may cause a reduction in reliability of vehicle speed information based on the vehicle wheel speed sensors. Thus, it is useful to precisely detect the rationality.

According to the configuration disclosed in JP Publication 912, if the vehicle speed information is not normal, based on the premise that the second vehicle speed is normal, it can be estimated that there is some abnormality in the vehicle wheel speed sensors used to calculate the first vehicle speed.

Here, under a situation where the vehicle is stuck in a muddy ground, for example, a relatively great drive force due to an accelerator pedal operation by a driver may cause the wheel slip. The wheel slip may cause the difference between the first vehicle speed and the second vehicle speed to be great even if the vehicle wheel speed sensors are normal. Thus, according to a way of merely determining an abnormality of the vehicle wheel speed sensors based on only the difference between the first vehicle speed and the second vehicle speed, there is a problem that a accuracy in detecting the abnormality may be reduced. It is noted that such a problem also occurs even with a way of merely determining an abnormality of the vehicle wheel speed sensors based only on the difference between respective values of the vehicle wheel speed sensors. This is because the wheel slip may cause the difference between the respective values of the vehicle wheel speed sensors to be great even if all the vehicle wheel speed sensors are operating normally.

As a solution to such a problem, there may be a way of determining, only in a vehicle stopped state in which the wheel slip does not occur, whether the respective values of the vehicle wheel speed sensors are within a normal range (i.e., greater than or equal to 0, and less than or equal to a predetermined value) to detect the abnormality of the vehicle wheel speed sensors.

However, it is difficult for such a way to detect the abnormality in such a mode in which the value of the vehicle wheel speed sensor is smaller than its normal value. This is because the vehicle wheel speed sensor having the abnormality in such a mode outputs the value near 0 in the vehicle stopped state, and thus there is probability that the value is regarded as normal.

Therefore, some embodiments provide an abnormality information generating apparatus, etc., that can detect an abnormality of a vehicle wheel speed sensor in a mode in which a value of the vehicle wheel speed sensor becomes smaller than its normal value.

SUMMARY

According to one aspect of the disclosure, an abnormality information generating apparatus is provided that generates information representing a rationality related to a plurality of vehicle wheel speed sensors that are installed at wheels of a vehicle, respectively, the abnormality information generating apparatus includes a processing device configured to generate the information when (1) a brake force is applied to the wheels, (2) a vehicle body speed based on a rpm of a rotation member is greater than a first threshold, the rotation member being common to drive wheels and being configured to transmit drive force to the drive wheels, and (3) only arbitrary one of the vehicle wheel speed sensors has a detected value smaller than a second threshold, the second threshold being smaller than the first threshold.

DESCRIPTION OF EMBODIMENTS

In the following, embodiments will be described with reference to the accompanying drawings.

Figure 1:
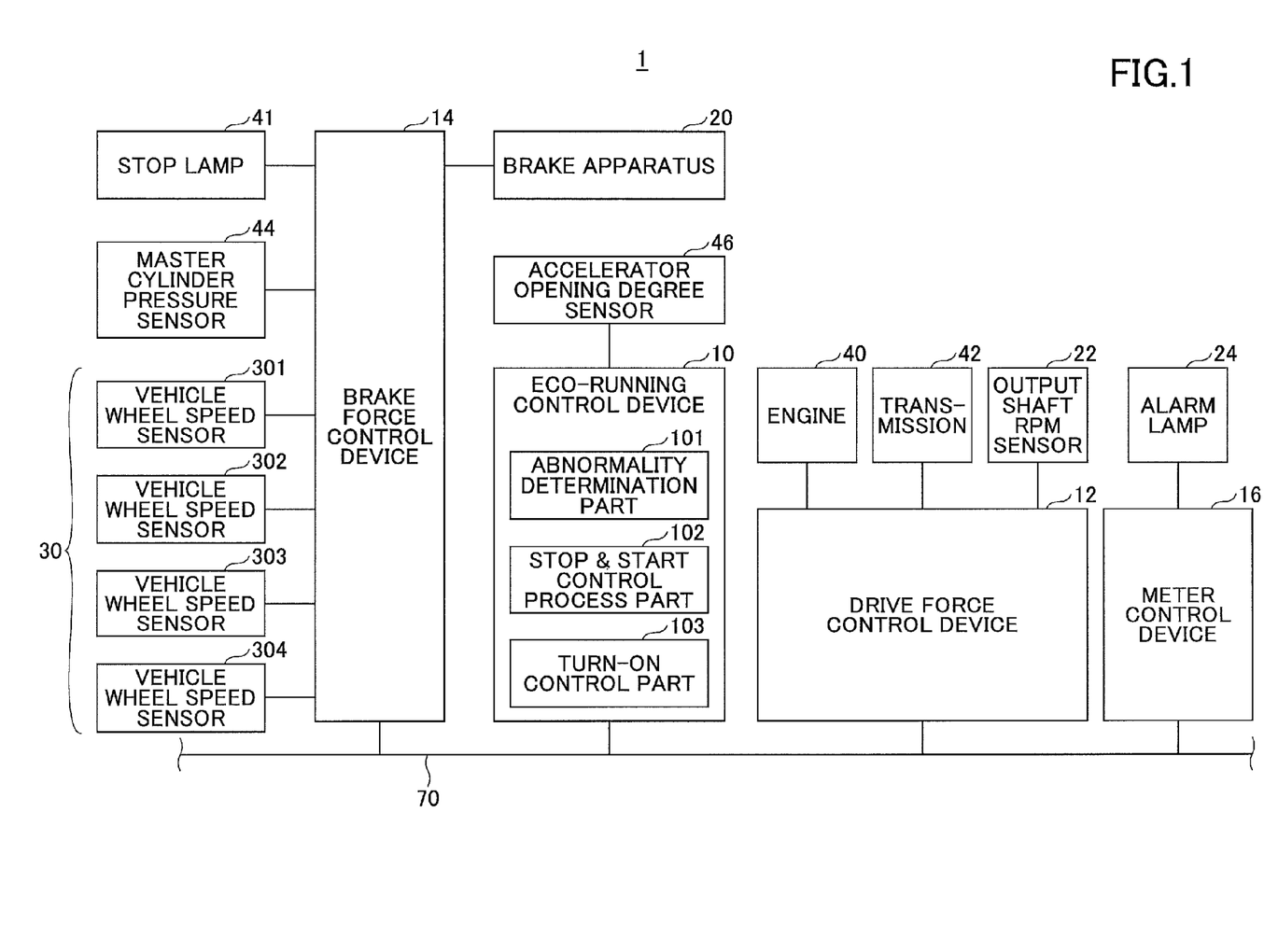
FIG. 1 is a diagram illustrating an example of a vehicle drive control system 1 according to an embodiment.

FIG. 1 is a diagram illustrating an example of a vehicle drive control system 1 according to an embodiment.

The vehicle drive control system 1 includes an eco-running control device 10 (an example of an abnormality information generating apparatus), a drive force control device 12, a brake force control device 14, and a meter control device 16. The eco-running control device 10, the drive force control device 12, the brake force control device 14, and the meter control device 16 are embodied by ECUs (Electronic Control Units), respectively, and coupled to each other via CAN (controller area network) 70.

The eco-running control device 10 is coupled to an accelerator opening degree sensor 46 that detects an accelerator opening degree (i.e., an accelerator pedal operation amount). The eco-running control device 10 includes an abnormality determination part 101, a Stop & Start control process part 102, and a turn-on control part 103. The function of the eco-running control device 10 is described hereinafter.

The drive force control device 12 controls an engine 40 and a transmission 42. For example, the drive force control device 12 controls the engine 40 and the transmission 42 to generate a driver demand drive force that is determined according to an operation amount of an accelerator pedal. Further, in the case of a vehicle that includes a vehicle speed automatic control function such as ACC (Adaptive Cruise Control), etc., the drive force control device 12 controls the engine 40 and the transmission 42 to generate a demand drive force that is determined according to a relationship between a host vehicle and a preceding vehicle. It is noted that the drive force control device 12 corrects the demand drive force such as a driver demand drive force, etc., to a minimum value (i.e., implements a brake override function) in a situation where a demand brake force (including a driver demand brake force) greater than or equal to a predetermined value Fbt is generated. In this case, the drive force control device 12 controls a throttle position to be minimum (within a range in which an engine stall does not occur), for example. It is noted that the predetermined value Fbt corresponds to a threshold to be exceeded for the brake force control device 14 to turn on a stop lamp 41.

The drive force control device 12 is coupled to an output shaft rpm sensor 22 that detects an rpm (i.e., a rational speed) of an output shaft of the transmission 42. The drive force control device 12 periodically calculates, based on an output signal of the output shaft rpm sensor 22, a vehicle body speed V1 to output the calculated vehicle body speed V1 to the CAN 70.

The brake force control device 14 controls a brake apparatus 20 to apply the brake force (i.e., a friction force for braking the rotation) to the wheels. The brake apparatus 20 includes an oil hydraulic circuit (not illustrated) in which a master cylinder, wheel cylinders of the respective wheels, a pump, solenoid valves, etc., are provided. For example, the brake force control device 14 controls the brake apparatus 20 to generate the driver demand brake force that is determined according to an operation amount of a brake pedal. Further, in the case of a vehicle that includes a vehicle speed automatic control function such as ACC, Pre-Crash Safety, etc., the brake force control device 14 controls the brake apparatus 20 to generate a demand brake force that is determined according to a relationship between the host vehicle and the preceding vehicle.

The brake force control device 14 is coupled to vehicle wheel speed sensors 30, the stop lamp 41, and a master cylinder pressure sensor 44. The brake force control device 14 turns on a stop lamp switch (not illustrated) to turn on the stop lamp 41 when the demand brake force (including the driver demand brake force) greater than or equal to the predetermined value Fbt is generated. The brake force control device 14 periodically outputs a state of the stop lamp 41 (an on/off state of the stop lamp switch, for example), and a master cylinder pressure based on a detected value of the master cylinder pressure sensor 44 to the CAN 70.

The vehicle wheel speed sensors 30 includes vehicle wheel speed sensors 301, 302, 303, and 304 that are provided for the wheels, respectively. The vehicle wheel speed sensors 301, 302, 303, and 304 are provided for a right front wheel, a left front wheel, a right rear wheel, and a left rear wheel, respectively. In the following, when the vehicle wheel speed sensors 301, 302, 303, and 304 are specified separately, the expression "vehicle wheel speed sensors 301, 302, 303, and 304" may be used. The brake force control device 14 periodically outputs the values detected by the respective vehicle wheel speed sensors 301, 302, 303, and 304 to the CAN 70. It is noted that the respective detected values of the vehicle wheel speed sensors 301, 302, 303, and 304 may be in a pulse width expression; however, in the following, as an example, it is assumed that the detected values of the vehicle wheel speed sensors 301, 302, 303, and 304 are converted values in a vehicle speed expression.

The brake force control device 14 periodically calculates, based on the output signals of the vehicle wheel speed sensors 30, a vehicle body speed V2 to output the calculated vehicle body speed V2 to the CAN 70. For example, the brake force control device 14 calculates the vehicle body speed V2 based on an average value of the respective detected values of the vehicle wheel speed sensors 301, 302, 303, and 304. For example, the brake force control device 14 may calculate the vehicle body speed V2 based on an average value of the detected values of the vehicle wheel speed sensors related to driven wheels, among the detected values of the vehicle wheel speed sensors 301, 302, 303, and 304.

The meter control device 16 controls a display of a meter (not illustrated). The meter includes an alarm lamp (warning lamp) 24.

Figure 2:
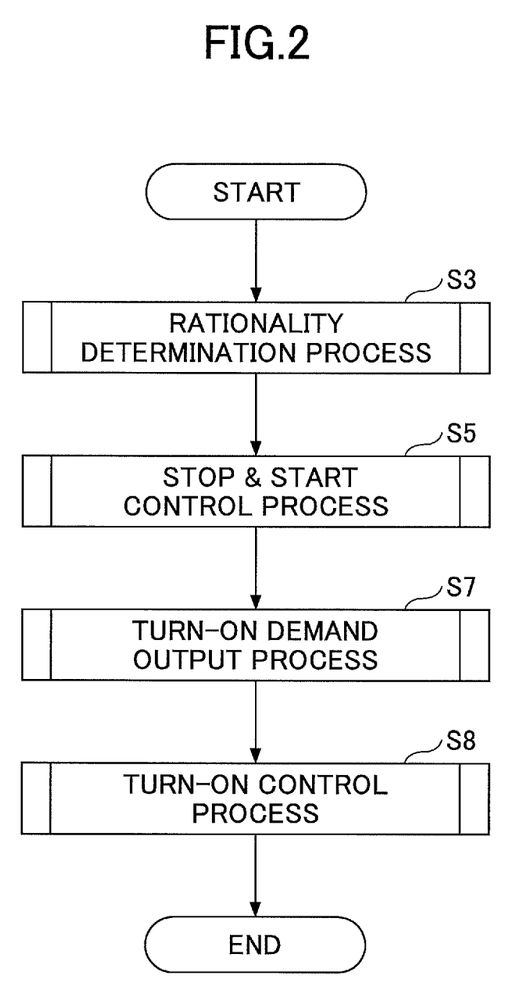
FIG. 2 is a flowchart illustrating an example of a process executed by the vehicle drive control system 1.

FIG. 2 is a flowchart illustrating an example of a process executed by the vehicle drive control system 1. The process illustrated in FIG. 2 may be performed at a predetermined cycle during an ON state of an ignition switch, for example.

In step S3, the abnormality determination part 101 of the eco-running control device 10 performs a rationality determination process. An example of the rationality determination process is described hereinafter.

In step S5, the Stop & Start control process part 102 of the eco-running control device 10 performs a Stop & Start control process based on the rationality determination process result. An example of the Stop & Start control is described hereinafter.

In step S7, the turn-on control part 103 of the eco-running control device 10 performs a turn-on demand output process based on the rationality determination process. An example of the turn-on demand output process is described hereinafter.

In step S8, the meter control device 16 performs a turn-on control process based on the turn-on demand output process result. An example of the turn-on control process is described hereinafter.

Figure 3:
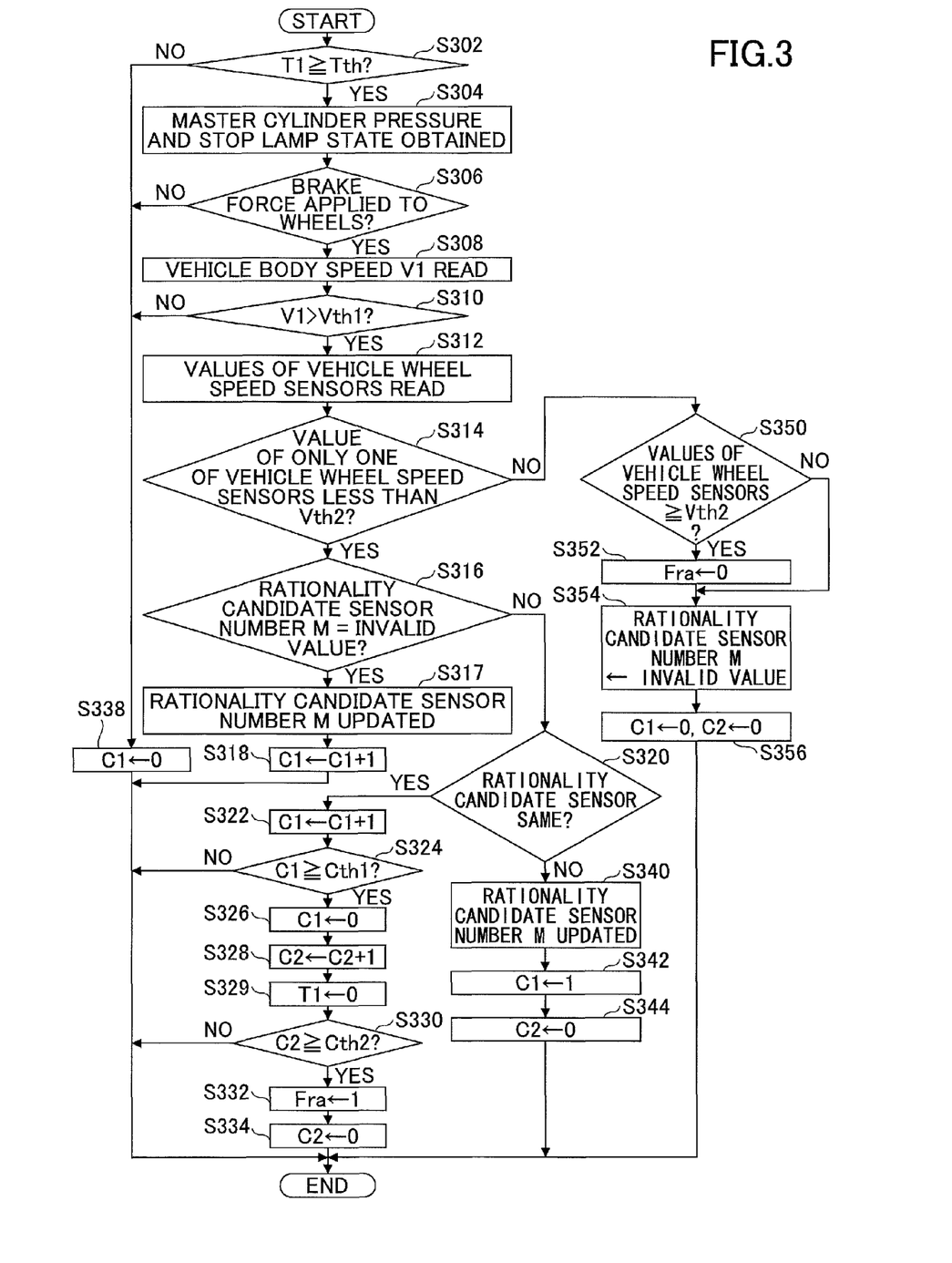
FIG. 3 is a flowchart illustrating an example of a rationality determination process.

FIG. 3 is a flowchart illustrating an example of the rationality determination process. The rationality determination process illustrated in FIG. 3 may be performed as the process of step S3 in FIG. 2.

In step S302, the abnormality determination part 101 of the eco-running control device 10 determines whether a value of a timer T1 is greater than or equal to a predetermined value Tth. The predetermined value Tth is greater than 0, and may be about 5 sec, for example. An initial value of the timer T1 is "0", for example.

In step S304, the abnormality determination part 101 reads the master cylinder pressure and the state of the stop lamp 41 obtained via the CAN 70 immediately before this process cycle.

In step S306, the abnormality determination part 101 determines, based on the master cylinder pressure and the state of the stop lamp 41, whether brake force is being applied to the wheels. For example, the abnormality determination part 101 determines that brake force is being applied to the wheels when at least one of the following conditions (1) and (2) is met.
Condition (1): the master cylinder pressure being greater than or equal to a predetermined value.
Condition (2): the stop lamp 41 being in an ON state.
It is noted that, in another example, the abnormality determination part 101 may determine, based on a brake pedal operation amount, the demand brake force (including the driver demand brake force), etc., that may be obtained via the CAN 70, whether the brake force is applied to the wheels. If the determination result is "YES", the process goes to step S308, and if the determination result is "NO", the process goes to step S338.

In step S308, the abnormality determination part 101 reads the vehicle body speed V1 obtained via the CAN 70 immediately before this process cycle.

In step S310, the abnormality determination part 101 determines whether the vehicle body speed V1 is greater than a predetermined threshold Vth1. The predetermined threshold Vth1 is within a range between 3 km/h and 9 km/h, for example. If the determination result is "YES", the process goes to step S312, and if the determination result is "NO", the process goes to step S338.

In step S312, the abnormality determination part 101 reads the respective detected values of the vehicle wheel speed sensors 301, 302, 303, and 304 obtained via the CAN 70 immediately before this process cycle.

In step S314, the abnormality determination part 101 determines whether only arbitrary one of the detected values of the vehicle wheel speed sensors 301, 302, 303, and 304 is smaller than a predetermined threshold Vth2 (i.e., whether arbitrary one of the detected values of the vehicle wheel speed sensors 301, 302, 303, and 304 is smaller than a predetermined threshold Vth2 and others are not smaller than the predetermined threshold Vth2). The predetermined threshold Vth2 is greater than 0 but smaller than the predetermined threshold Vth1. For example, the predetermined threshold Vth2 is about 3 km/h, for example. If the determination result is "YES", the process goes to step S316, and if the determination result is "NO", the process goes to step S350.

In step S316, the abnormality determination part 101 determines whether a number M (referred to as "a rationality candidate sensor number M", hereinafter) for identifying the vehicle wheel speed sensor that is a rationality candidate, among the vehicle wheel speed sensors 301, 302, 303, and 304, has an invalid value "NULL". An initial value of the rationality candidate sensor number M is the invalid value "NULL". The rationality candidate sensor number M being the invalid value "NULL" means that there is no rationality candidate at present. If the determination result is "YES", the process goes to step S318, and if the determination result is "NO", the process goes to step S320.

In step S317, the abnormality determination part 101 updates the rationality candidate sensor number M. Specifically, the abnormality determination part 101 replaces the rationality candidate sensor number M (i.e., the invalid value "NULL") with the number associated with the vehicle wheel speed sensor that is outputting the detected value smaller than the predetermined threshold Vth2 at this cycle.

In step S318, the abnormality determination part 101 increments a first counter C1 by "1". An initial value of the first counter C1 is "0".

In step S320, the abnormality determination part 101 determines whether the number associated with the vehicle wheel speed sensor that is outputting the detected value smaller than the predetermined threshold Vth2 at this cycle corresponds to the rationality candidate sensor number M. Specifically, the abnormality determination part 101 determines whether the vehicle wheel speed sensor, among the vehicle wheel speed sensors 301, 302, 303, and 304, that is outputting the detected value smaller than the predetermined threshold Vth2 at this cycle corresponds to the vehicle wheel speed sensor that is outputting the detected value smaller than the predetermined threshold Vth2 at the previous cycle. If the determination result is "YES", the process goes to step S322, and if the determination result is "NO", the process goes to step S340.

In step S322, the abnormality determination part 101 increments the first counter C1 by "1".

In step S324, the abnormality determination part 101 determines whether the first counter C1 is greater than or equal to a predetermined threshold Cth1. The predetermined threshold Cth1 corresponds to a cycle number corresponding to about 5 sec, for example. If the determination result is "YES", the process goes to step S326, and if the determination result is "NO", the process ends directly.

In step S326, the abnormality determination part 101 resets the first counter C1 to "0".

In step S328, the abnormality determination part 101 increments a second counter C2 by "1". An initial value of the second counter C2 is "0".

In step S329, the abnormality determination part 101 resets the timer T1 to "0".

In step S330, the abnormality determination part 101 determines whether the second counter C2 is greater than or equal to a predetermined threshold Cth2. The predetermined threshold Cth2 is determined according to a necessary detection accuracy for the rationality, etc., and is "2", for example. If the determination result is "YES", the process goes to step S332, and if the determination result is "NO", the process ends directly.

In step S332, the abnormality determination part 101 sets a rationality flag Fra to "1". The rationality flag Fra being "1" means that the rationality is detected.

In step S334, the abnormality determination part 101 resets the second counter C2 to "0".

In step S338, the abnormality determination part 101 resets the first counter C1 to "0".

In step S340, the abnormality determination part 101 updates the rationality candidate sensor number M. Specifically, the abnormality determination part 101 replaces the rationality candidate sensor number M with the number associated with the vehicle wheel speed sensor that is outputting the detected value smaller than the predetermined threshold Vth2 at this cycle.

In step S342, the abnormality determination part 101 resets the first counter C1 to "1".

In step S344, the abnormality determination part 101 resets the second counter C2 to "0".

In step S350, the abnormality determination part 101 determines whether the detected values of the vehicle wheel speed sensors 301, 302, 303, and 304 are greater than or equal to the predetermined threshold Vth2. If the determination result is "YES", the process goes to step S352, and if the determination result is "NO", the process goes to step S354.

In step S352, the abnormality determination part 101 sets the rationality flag Fra to "0".

In step S354, the abnormality determination part 101 sets the rationality candidate sensor number M to the invalid value "NULL".

In step S356, the abnormality determination part 101 sets the first counter C1 to "0" and the second counter C2 to "0".

According to the rationality determination process illustrated in FIG. 3, the rationality flag Fra is set to "1", when the brake force is applied to the wheels, the vehicle body speed V1 is greater than the predetermined threshold Vth1, and only arbitrary one of the vehicle wheel speed sensors 301, 302, 303, and 304 is outputting the detected value smaller than the predetermined threshold Vth2.

Figure 4:
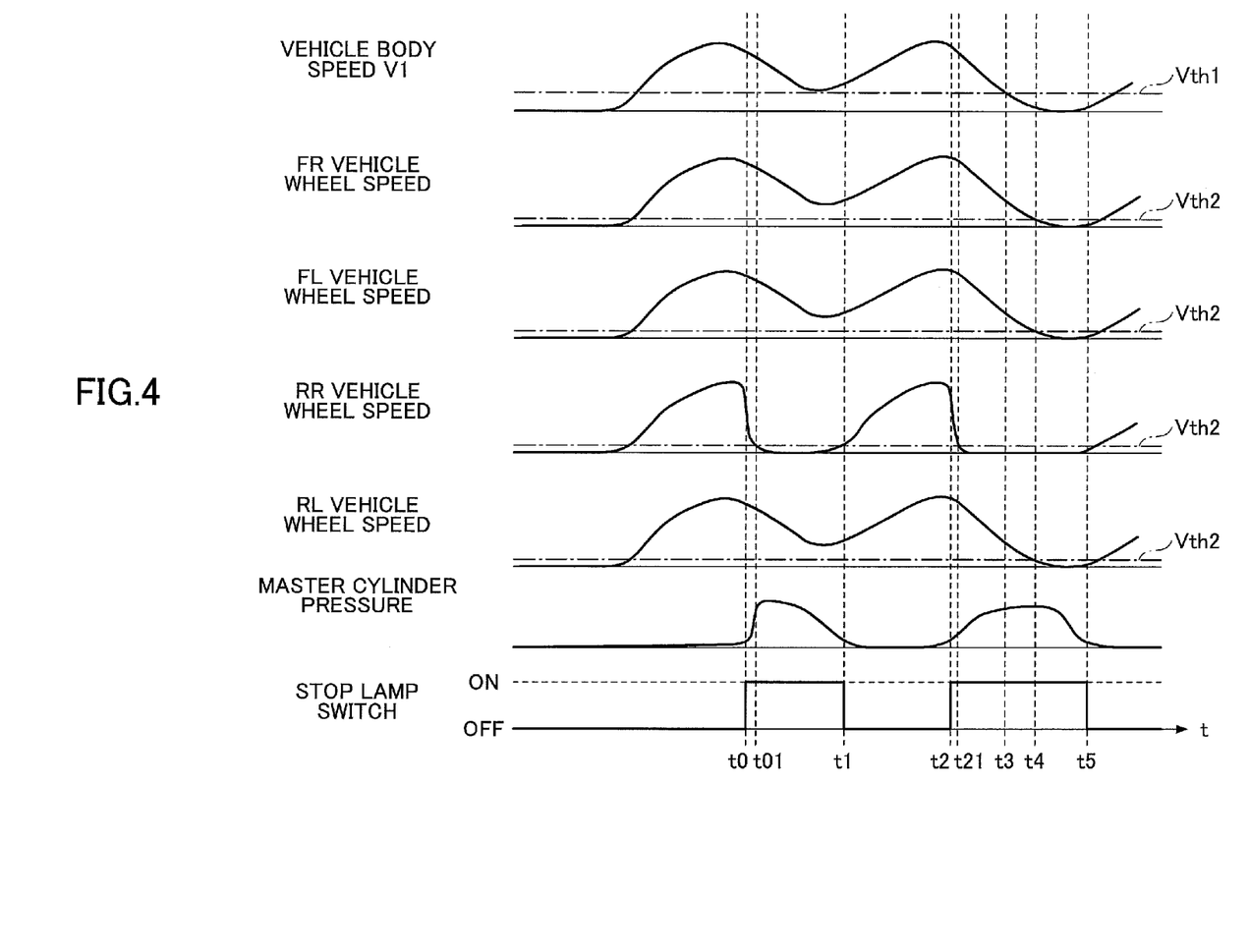
FIG. 4 is a diagram explaining the rationality determination process in FIG. 3.

FIG. 4 is diagram explaining the rationality determination process in FIG. 3, and is a timing chart illustrating time series of various states. In FIG. 4, from its upper side, a time series of the vehicle body speed V1, a time series of the detected value of the vehicle wheel speed sensors 301 related to the right front wheel, a time series of the detected value of the vehicle wheel speed sensors 302 related to the left front wheel, a time series of the detected value of the vehicle wheel speed sensors 303 related to the right rear wheel, a time series of the detected value of the vehicle wheel speed sensors 304 related to the left rear wheel, a time series of the master cylinder pressure, and a time series of the on/off state of the stop lamp 41.

In the example illustrated in FIG. 4, at time point t0, a demand brake force greater than or equal to the predetermined value Fbt is generated, which causes the stop lamp 41 to turn on. During a time period from time point t01 to time point t1, a state in which the vehicle body speed V1 is greater than the predetermined threshold Vth1, and only the vehicle wheel speed sensors 303 of the vehicle wheel speed sensors 301, 302, 303, and 304 is outputting the detected value smaller than the predetermined threshold Vth2 continues. As a result of this, the first counter C1 becomes greater than or equal to the predetermined threshold Cth1, which causes the second counter C2 to be "1". At time point 51, the demand brake force becomes 0, which causes the stop lamp 41 to turn off. Then, at time point t2, the demand brake force greater than or equal to the predetermined value Fbt is generated, which causes the stop lamp 41 to turn on again. During the time period from time point t21 to time point t3, the state in which the vehicle body speed V1 is greater than the predetermined threshold Vth1, and only the vehicle wheel speed sensors 303 of the vehicle wheel speed sensors 301, 302, 303, and 304 is outputting the detected value smaller than the predetermined threshold Vth2 continues again. As a result of this, the first counter C1 becomes greater than or equal to the predetermined threshold Cth1, which causes the second counter C2 to be "2". When the second counter C2 is "2", the determination result in step S330 is "YES", which causes the rationality flag Fra to be set to "1".

Here, under a situation where the vehicle is stuck in a muddy ground, for example, the drive force due to the accelerator pedal operation by the driver may cause a wheel slip. Wheel slip may cause the difference between the detected values of the vehicle wheel speed sensors 301, 302, 303, and 304. Further, similarly, under a situation where the vehicle has three wheels on a low μ surface of the road and one wheel on a high μ surface of the road, the drive force due to the accelerator pedal pressed on by the driver may cause only the wheel on the high μ surface to be near 0. In this way, in a state where a relatively great drive force (substantially greater than a drive force corresponding to a creep torque, for example) is applied to the wheel, there may be a difference between the detected values of the vehicle wheel speed sensors 301, 302, 303, and 304, depending on the difference between the values of the road surface μ related to the corresponding wheels, even if the vehicle wheel speed sensors 301, 302, 303, and 304 are operating normally.

Here, according to the rationality determination process illustrated in FIG. 3, the rationality flag Fra is set to "1", when the brake force is applied to the wheels, the vehicle body speed V1 is greater than the predetermined threshold Vth1, and only arbitrary one of the vehicle wheel speed sensors 301, 302, 303, and 304 is outputting the detected value smaller than the predetermined threshold Vth2. In the state in which the brake force is applied to the wheels, a relatively great drive force is not applied to the wheels. Typically, in the state in which the brake force is applied to the wheels, the demand drive force is minimum. Thus, according to the rationality determination process illustrated in FIG. 3, the rationality can be detected with high accuracy because the rationality is determined without using the detected values of the vehicle wheel speed sensors 301, 302, 303, and 304 in the state in which a relatively great drive force is applied to the wheels.

Further, according to the rationality determination process illustrated in FIG. 3, it is determined whether only arbitrary one of the vehicle wheel speed sensors 301, 302, 303, and 304 is outputting the detected value smaller than the predetermined threshold Vth2, on the condition that the vehicle body speed V1 is greater than the predetermined threshold Vth1. Thus, the abnormality (malformation) of the vehicle wheel speed sensor in a mode (referred to as "a smaller value mode", hereinafter) in which the detected (output) value is smaller than a normal value can be detected with high accuracy. This is because it is highly expected, if the vehicle wheel speed sensors 301, 302, 303, and 304 do not have the abnormality in such a smaller value mode, that the detected values of the vehicle wheel speed sensors 301, 302, 303, and 304 are greater than or equal to the predetermined threshold Vth2 in the situation where the vehicle body speed V1 is greater than the predetermined threshold Vth1. Further, when the vehicle body speed V1 is less than or equal to the predetermined threshold Vth1 (the vehicle body speed V1 is near 0, for example), the detected values of the vehicle wheel speed sensors 301, 302, 303, and 304 are smaller than the predetermined threshold value Vth2 (see the period from time point t4 to time point t5, for example), even if the vehicle wheel speed sensors 301, 302, 303, and 304 include the vehicle wheel speed sensor which has the abnormality in such a smaller value mode. Specifically, when the vehicle body speed V1 is smaller than the predetermined threshold Vth1 (the vehicle body speed V1 is near 0, for example), the vehicle wheel speed sensor that has the abnormality in such a smaller value mode (see a wave shape of the values (RR vehicle wheel speed) of the vehicle wheel speed sensor 303) outputs the value near 0 (normal value) in the vehicle stopped state, and thus may be regarded as not having the abnormality.

Further, according to the rationality determination process illustrated in FIG. 3, the rationality flag Fra is set to "1", when a state in which the brake force is applied to the wheels, the vehicle body speed V1 is greater than the predetermined threshold Vth1, and only arbitrary one of the vehicle wheel speed sensors 301, 302, 303, and 304 outputs the detected value smaller than the predetermined threshold Vth2 continues for a predetermined time (corresponding to the predetermined threshold Cth1) or longer. With this arrangement, it becomes possible to reduce the affection by the noise, etc., and thus increase the reliability of the rationality determination process result.

Further, according to the rationality determination process illustrated in FIG. 3, the rationality flag Fra is set to "1", when such an event occurs more than one time (i.e., the predetermined threshold Cth2) in which the state in which the brake force is applied to the wheels, the vehicle body speed V1 is greater than the predetermined threshold Vth1, and only arbitrary one of the vehicle wheel speed sensors 301, 302, 303, and 304 outputs the detected value smaller than the predetermined threshold Vth2 continues for a predetermined time (corresponding to the predetermined threshold Cth1) or longer. With this arrangement, it becomes possible to reduce the affection by the noise, etc., and thus increase the reliability of the rationality determination process result.

Figure 5:
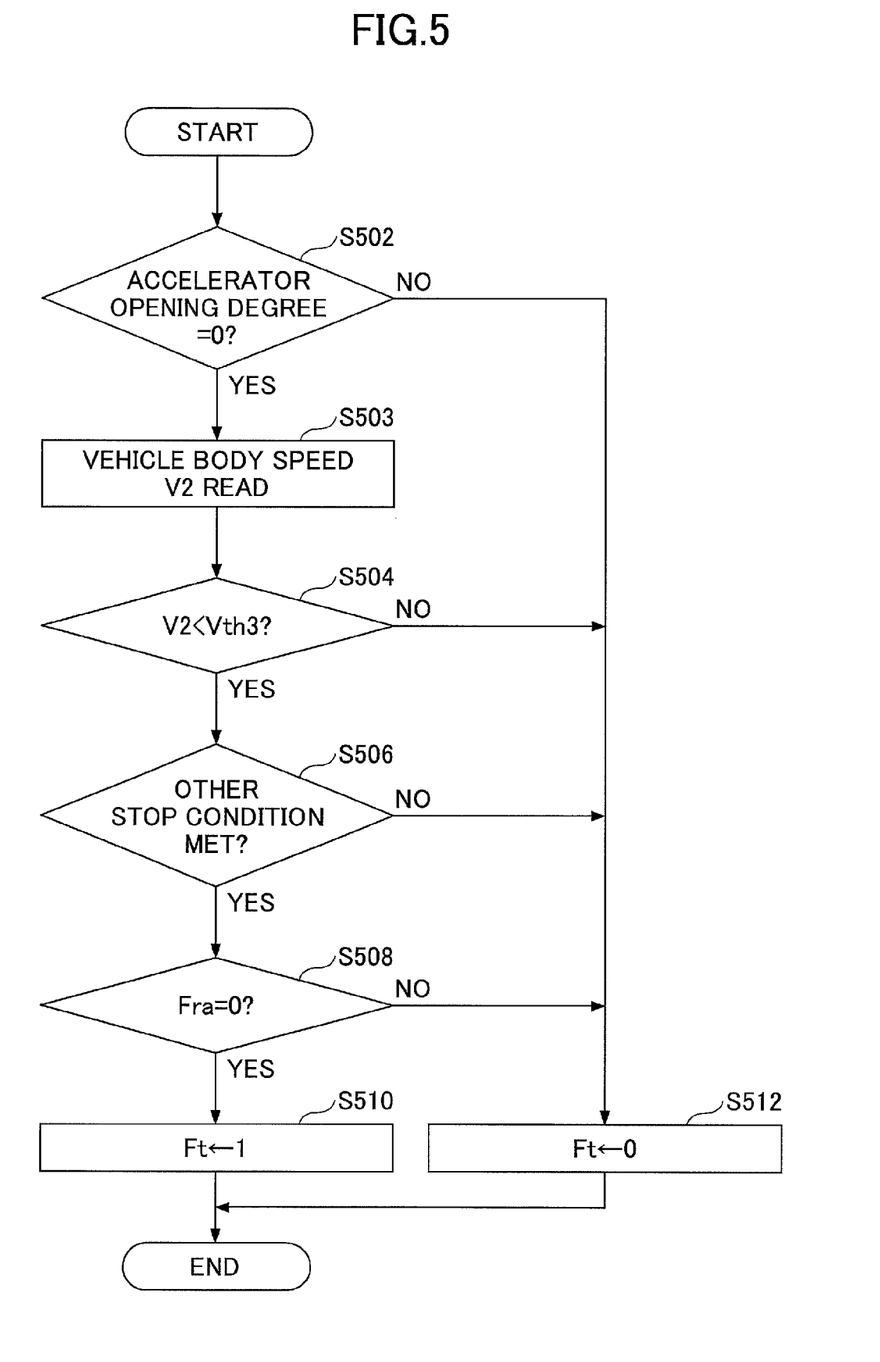
FIG. 5 is a flowchart illustrating an example of a Stop and Start control process.

FIG. 5 is a flowchart illustrating an example of the Stop and Start control process. The Stop and Start control process illustrated in FIG. 5 may be performed as the process of step S5 in FIG. 2.

In step S502, the Stop & Start control process part 102 of the eco-running control device 10 determines, based on the detected value of the accelerator opening degree sensor 46, whether the accelerator opening degree is greater than 0. If the determination result is "YES", the process goes to step S503, and if the determination result is "NO", the process goes to step S512.

In step S503, the Stop & Start control process part 102 reads the vehicle body speed V2 obtained via the CAN 70 immediately before this process cycle.

In step S504, the Stop & Start control process part 102 determines whether the vehicle body speed V2 is greater than a predetermined threshold Vth3. The predetermined threshold Vth3 is within a range between 3 km/h and 15 km/h, for example. The predetermined threshold Vth3 may be the same as the predetermined threshold Vth1. If the determination result is "YES", the process goes to step S506, and if the determination result is "NO", the process goes to step S512.

In step S506, the Stop & Start control process part 102 determines whether a stop condition (referred to as "other stop condition", hereinafter) other than the stop conditions in step S502 and step S504 is met. The other stop condition is met when all the conditions (11) through (13) are met, for example.
Condition (11): a SOC (State Of Charge) of a battery is greater than or equal to a predetermined value.
Condition (12): a negative pressure in a brake booster is closer to a vacuum value than a predetermined threshold.
Condition (13): a road gradient based on the detected values of the vehicle wheel speed sensors 30 is greater than or equal to a predetermined value.
It is noted that the conditions (11) through (13) may be changed, if appropriate. Further, another condition related to an operation state of the brake pedal or a state of an air conditioner may be added as an AND condition with respect to the conditions (11) through (13). If the determination result is "YES", the process goes to step S508, and if the determination result is "NO", the process goes to step S512.

In step S508, the Stop & Start control process part 102 determines whether the rationality flag Fra is "0". If the determination result is "YES", the process goes to step S510, and if the determination result is "NO", the process goes to step S512.

In step S510, the Stop & Start control process part 102 sets a Stop & Start instruction flag Ft to "1". The Stop & Start instruction flag Ft is described hereinafter.

In step S512, the Stop & Start control process part 102 sets the Stop & Start instruction flag Ft to "0".

According to the process illustrated in FIG. 5, the Stop & Start instruction flag Ft is set to "0" when the rationality flag Fra is "1".

Figure 6:
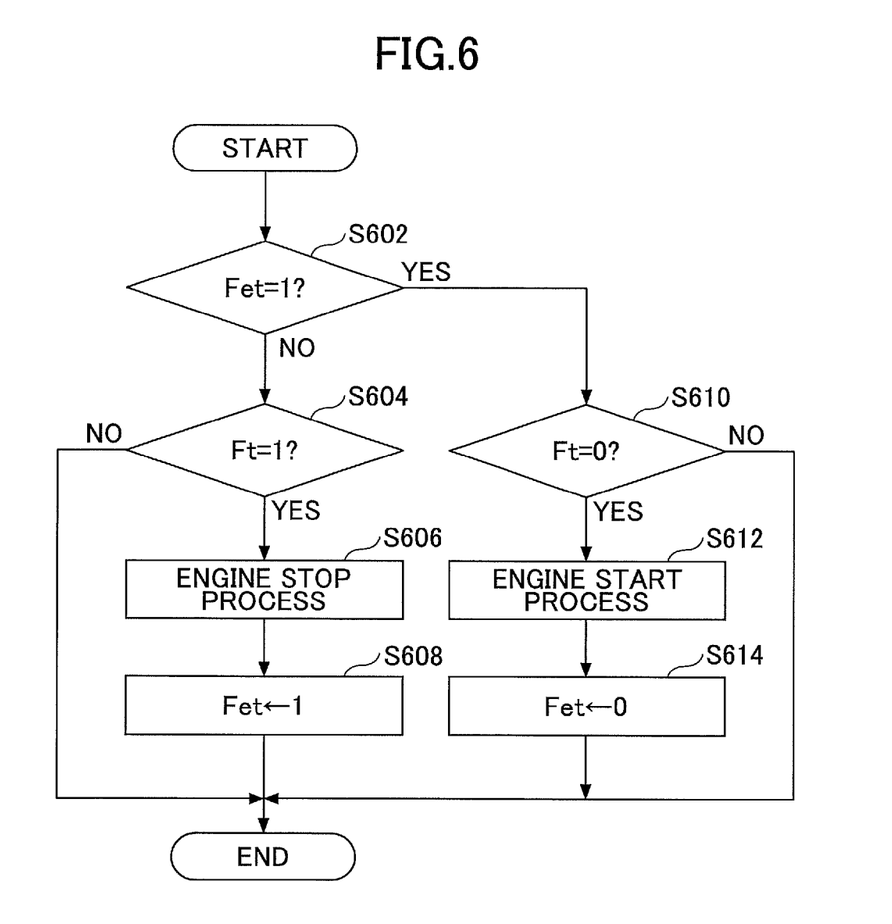
FIG. 6 is a flowchart illustrating an example of an engine stop and start process executed by a drive force control device 12.

FIG. 6 is a flowchart illustrating an example of an engine stop and start process executed by a drive force control device 12. The process illustrated in FIG. 6 may be performed at a predetermined cycle during an ON state of an ignition switch, for example.

In step S602, the drive force control device 12 determines whether an engine state flag Fet is "1". The value "1" of the engine state flag Fet means that the engine is in its stopped state, and the value "0" of the engine state flag Fet means that the engine is in its running state. If the determination result is "YES", the process goes to step S604, and if the determination result is "NO", the process goes to step S610.

In step S604, the drive force control device 12 determines whether the Stop & Start instruction flag Ft is "1". If the determination result is "YES", the process goes to step S606, and if the determination result is "NO", the process ends directly.

In step S906, the drive force control device 12 performs an engine stop process. The engine stop process include performing a fuel cut to reduce the rpm of the engine 40 to 0.

In step S608, the drive force control device 12 sets the engine state flag Fet to "1".

In step S610, the drive force control device 12 determines whether the Stop & Start instruction flag Ft is "0". If the determination result is "YES", the process goes to step S612, and if the determination result is "NO", the process ends directly.

In step S612, the drive force control device 12 performs an engine start process. The engine start process includes driving a starter (not illustrated) to increase the rpm of the engine 40 to an idle rpm (i.e., idling rotational speed).

In step S614, the drive force control device 12 sets the engine state flag Fet to "0".

Here, according to the process illustrated in FIG. 5, the Stop & Start instruction flag Ft is set to "1", on the condition that the vehicle body speed V2 is smaller than the predetermined threshold Vth3. However, when the rationality is generated, there is a probability that the reliability of the vehicle is reduced. It is not desirable that the engine stop process (step S606 in FIG. 6) is performed based on the vehicle body speed V2 whose reliability may be reduced.

According to the process illustrated in FIG. 6, the engine stop process is not performed when the rationality flag Fra is "1", in relation to the process illustrated in FIG. 5. Specifically, as described above, according to the process illustrated in FIG. 5, if the rationality flag Fra is "1", the Stop & Start instruction flag Ft is set to "0" even when the stop conditions are met. Thus, the engine stop process is not performed by the process in FIG. 6, when the rationality flag Fra is "1". In this way, according to the processes in FIG. 5 and FIG. 6, it becomes possible to prevent the engine stop process when the rationality flag Fra is "1". Therefore, it becomes possible to prevent the engine stop process from being performed based on the vehicle body speed V2 whose reliability may be reduced.

Figure 7:
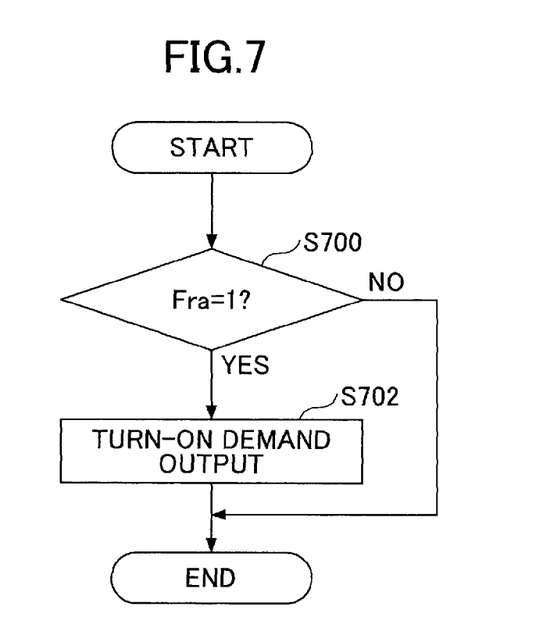
FIG. 7 is a flowchart illustrating an example of a turn-on demand output process.

FIG. 7 is a flowchart illustrating an example of a turn-on demand output process. The turn-on demand output process illustrated in FIG. 7 may be performed as the process of step S7 in FIG. 2.

In step S700, the turn-on control part 103 of the eco-running control device 10 determines whether the rationality flag Fra is "1". If the determination result is "YES", the process goes to step S702, and if the determination result is "NO", the process ends directly.

In step S702, the turn-on control part 103 outputs a turn-on demand to the CAN 70. It is noted that the turn-on control part 103 may store diagnosis information indicative of outputting the turn-on demand in a predetermined memory device, in addition to outputting the turn-on demand to the CAN 70.

According to the process illustrated in FIG. 7, the turn-on demand can be output when the rationality flag Fra is "1". As a result of this, it becomes possible to cause the meter control device 16 to turn on the alarm lamp 24 when the rationality flag Fra is "1", in relation to the process illustrated in FIG. 8 described hereinafter.

Figure 8:
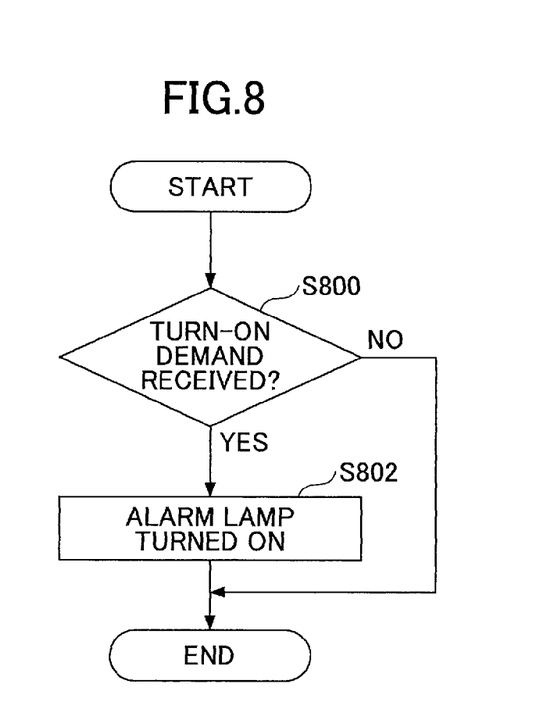
FIG. 8 is a flowchart illustrating an example of a turn-on control process.

FIG. 8 is a flowchart illustrating an example of the turn-on control process. The turn-on control process illustrated in FIG. 8 may be performed as the process of step S8 in FIG. 2.

In step S800, the meter control device 16 determines whether the meter control device 16 receives the turn-on demand via the CAN 70. If the determination result is "YES", the process goes to step S802, and if the determination result is "NO", the process ends directly.

In step S802, the meter control device 16 turns on the alarm lamp 24.

According to the process illustrated in FIG. 8, the alarm lamp 24 can turn on when the rationality flag Fra is "1". Thus, it becomes possible to encourage the user to have the vehicle subject to maintenance, an inspection, etc.

Figure 9:
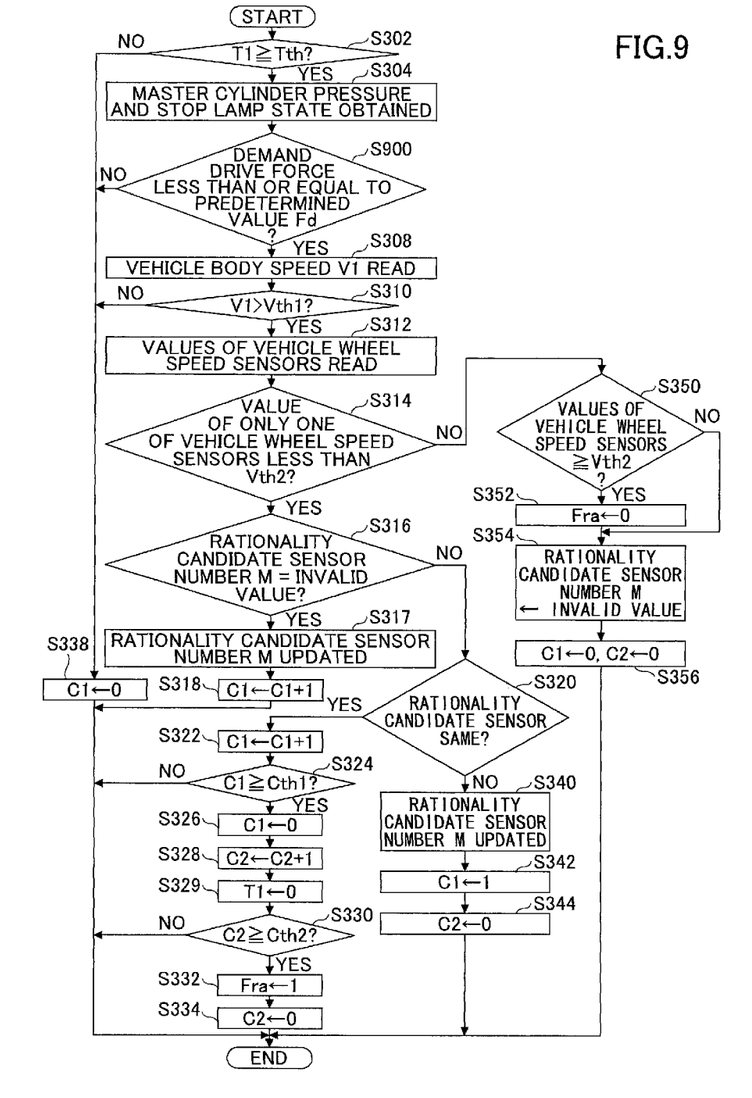
FIG. 9 is a flowchart illustrating an alternative example of the rationality determination process illustrated in FIG. 3.

FIG. 9 is a flowchart illustrating an alternative example of the rationality determination process illustrated in FIG. 3.

The rationality determination process illustrated in FIG. 9 differs from the rationality determination process illustrated in FIG. 3 in that step S306 is replaced with step S900.

In step S900, the abnormality determination part 101 determines whether the demand drive force is less than or equal to a predetermined value Fd. The predetermined value Fd may be a minimum value of a range in which the demand drive force may change. Whether the demand drive force is less than or equal to the predetermined value Fd can be determined based on the demand drive force that can be obtained via the CAN 70. Alternatively, whether the demand drive force is less than or equal to the predetermined value Fd may be determined based on the accelerator opening degree. For example, when the accelerator opening degree is 0, it may be determined that the demand drive force is less than or equal to the predetermined value Fd. If the determination result is "YES", the process goes to step S308, and if the determination result is "NO", the process goes to step S338.

According to the rationality determination process illustrated in FIG. 9, the same effects as the rationality determination process illustrated in FIG. 3 can be obtained. Specifically, according to the rationality determination process illustrated in FIG. 9, the rationality can be detected with high accuracy because the rationality is determined without using the detected values of the vehicle wheel speed sensors 301, 302, 303, and 304 in the state in which a relatively great drive force is applied to the wheels.

Further, according to the rationality determination process illustrated in FIG. 9, an opportunity to determine the rationality can be increased with respect to the rationality determination process illustrated in FIG. 3. This is because the state in which the brake force is applied to the wheels necessarily includes the state in which the demand drive force is less than or equal to the predetermined value Fd. In other words, the demand drive force being less than or equal to the predetermined value Fd is a necessary condition for the brake force being applied to the wheels.

The present disclosure includes references to specific embodiments. However, it should be understood that the claimed subject matter is not limited to the above-described embodiments, and variations and modifications may be made without departing from the scope of the claimed subject matter.

For example, in the embodiments described above, the eco-running control device 10, the drive force control device 12, the brake force control device 14, and the meter control device 16 may be unified or be modified to have the respective functions shared in a different manner, if appropriate. For example, a part of or all of the functions of the eco-running control device 10 may be included in the drive force control device 12. Further, the vehicle wheel speed sensors 30 may be coupled to the eco-running control device 10, instead of the brake force control device 14.

Further, according to the embodiments described above, the eco-running control device 10 includes the Stop & Start control process part 102; however, the Stop & Start control process part 102 may be omitted. In this case, the Stop & Start is not performed. Such a variant is suitable for an electric vehicle or a hybrid vehicle.

Further, according to the process illustrated in FIG. 3 (the same holds true for FIG. 9), the second counter C2 is used to increase the reliability; however, the second counter C2 may be omitted. Specifically, in the process illustrated in FIG. 3, step S302, step S328 through step S334, step S344, and a part of step S356 (related to the second counter C2) may be omitted.

Further, according to the process illustrated in FIG. 3 (the same holds true for FIG. 9), after the rationality flag has been set to "1", the rationality flag is reset to "0" when the determination result in step S314 is "NO" and the determination result in step S350 is "YES"; however, this is not essential. For example, step S350 and step S352 may be omitted. Further, after the rationality flag has been set to "1", the rationality flag may be reset to "0" when a state in which the determination result in step S314 is "NO" and the determination result in step S350 is "YES" continues for a predetermined number of cycles.

Further, according to the embodiments described above, the vehicle body speed V1 is calculated based on the detected value of the output shaft rpm sensor 22 that detects the rpm of the output shaft of the transmission 42; however, the vehicle body speed V1 may be calculated based on other parameters. For example, the vehicle body speed V1 may be calculated based on a detected value of an output shaft rpm sensor that detects a rpm of a rotation member that is other than the output shaft of the transmission 42 and is common to the drive wheels for transmitting the drive force to the drive wheels. Such a rotation member may be a reduction gear in the transmission 42, for example. Further, in the case where the vehicle is an electric vehicle or a hybrid vehicle, such a rotation member may be a output shaft of a drive motor or a gear of a reduction mechanism, for example.

Further, in the embodiments described above, the predetermined threshold Vth2 is a fixed value; however, the predetermined threshold Vth2 may be variable. For example, the predetermined threshold Vth2 may be varied according to the vehicle body speed V1 such that the predetermined threshold Vth2 is smaller than the vehicle body speed V1 by a predetermined value and greater than an lower limit value (about 3 km/h).

Further, in the embodiments described above, a state in which there is no abnormality in the output shaft rpm sensor 22 is premised; however, the rationality determination process may be prevented when the abnormality in the output shaft rpm sensor 22 is detected.

What is claimed is:

1. An abnormality information generating apparatus that generates information representing a rationality related to a plurality of vehicle wheel speed sensors that are installed at wheels of a vehicle, respectively, the abnormality information generating apparatus includes a processing device configured to
generate the information when (1) a brake force is applied to the wheels, (2) a vehicle body speed based on a rpm of a rotation member is greater than a first threshold, the rotation member being common to drive wheels and being configured to transmit drive force to the drive wheels, and (3) only arbitrary one of the vehicle wheel speed sensors has a detected value smaller than a second threshold, the second threshold being smaller than the first threshold.

2. The abnormality information generating apparatus of claim 1, wherein the processing device is configured to generate the information when a state, in which (1) the brake force is applied to the wheels, (2) the vehicle body speed is greater than the first threshold, and (3) only arbitrary one of the vehicle wheel speed sensors has a detected value smaller than the second threshold, continues for a predetermined period or longer.

3. The abnormality information generating apparatus of claim 1, wherein the processing device is further configured to turn on an alarm light when the processing device generates the information.

4. The abnormality information generating apparatus of claim 1, wherein the processing device is further configured to prevent an engine control apparatus from performing an automatic engine stop based on the vehicle wheel speed sensors, when the processing device generates the information.

5. An abnormality information generating apparatus that generates information representing a rationality related to a plurality of vehicle wheel speed sensors that are installed at wheels of a vehicle, respectively, the abnormality information generating apparatus includes a processing device configured to
generate the information when (1) a demand drive force is less than or equal to a predetermined value, (2) a vehicle body speed based on a rpm of a rotation member is greater than a first threshold, the rotation member being common to drive wheels and being configured to transmit drive force to the drive wheels, and (3) only arbitrary one of the vehicle wheel speed sensors has a detected value smaller than a second threshold, the second threshold being smaller than the first threshold.

6. The abnormality information generating apparatus of claim 5, wherein the processing device is further configured to turn on an alarm light when the processing device generates the information.

7. The abnormality information generating apparatus of claim 5, wherein the processing device is further configured to prevent an engine control apparatus from performing an automatic engine stop based on the vehicle wheel speed sensors, when the processing device generates the information.

8. A vehicle control system, comprising:
the abnormality information generating apparatus of claim 1; and
an engine control apparatus that automatically stops an engine in response to a stop demand generated based on the vehicle wheel speed sensors, wherein
the processing device of the abnormality information generating apparatus is further configured to prevent the engine control apparatus from automatically stopping the engine, when the processing device generates the information.

9. A vehicle control system, comprising:
the abnormality information generating apparatus of claim 5; and
an engine control apparatus that automatically stops an engine in response to a stop demand generated based on the vehicle wheel speed sensors, wherein
the processing device of the abnormality information generating apparatus is further configured to prevent the engine control apparatus from automatically stopping the engine, when the processing device generates the information.

* * * * *